Patented Sept. 14, 1937

2,092,945

UNITED STATES PATENT OFFICE 2,092,945

MANUFACTURE OF WATER SOLUBLE CHLORITES

George Paul Vincent, Niagara Falls, N. Y., assignor to The Mathieson Alkali Works, Inc., New York, N. Y., a corporation of Virginia No Drawing. Application August 15, 1934, Serial No. 739,940

12 Claims. (Cl. 23—85)

My invention relates to improvements in the manufacture of water soluble chlorites, sodium chlorite and calcium chlorite for example, by methods involving reaction between chlorine dioxide, an alkaline material corresponding to the chlorite to be made and a reducing agent, in an aqueous medium. Preferably the alkaline material is a free base.

It has hitherto been proposed, for example, to form sodium chlorite by reaction between chlorine dioxide and sodium peroxide and to form calcium chlorite by reaction between chlorine dioxide and calcium peroxide, with liberation of oxygen in each instance. These reactions are necessarily limited in application because of the fact that the cation of the peroxide becomes the cation of the chlorite.

I have found that improved efficiencies and economies can be obtained by using two reagents, an alkaline material corresponding to the chlorite to be made and an independent reducing agent. By so using two independent reagents, each can be selected with respect to its particular function in the reaction without reference to the function of the other. In one aspect this enables the use as reducing agents of inexpensive reagents, an important practical economy. Efficiencies corresponding to chlorine dioxide conversions as high as 90% or higher can be obtained.

As noted above, the alkaline material is preferably a free base. Alkaline carbonates appear to work in a manner somewhat similar to the free base, NaOH or Ca(OH)$_2$, for example, and may be used in the application of the invention. Efficiencies are better, however, when using a free base.

I have found carbonaceous reducing agents to be particularly advantageous in the application of my invention. It will be understood, however, that the invention is not limited to the use of carbonaceous reducing agents but other reducing agents, sulfurous reducing agents, for example, may be used. Carbonaceous reducing agents are particularly advantageous, however, because of their efficiency and inexpensiveness. The carbonaceous reducing agents which I have tried and found to be useful include coke, carbon, charcoal, wood, sawdust, paper pulp, sucrose, glucose and levulose. The following summarized type reaction will illustrate my invention as applied using such reducing agents:

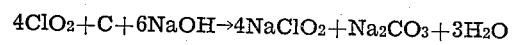

The following examples of embodiments of my invention in which a carbonaceous reducing agent is used will further illustrate its application:

*Example 1.*—2.5 parts (by weight) of chlorine dioxide, in a mixture with air in which (at standard conditions) the partial pressure of the chlorine dioxide approximated 10–25 mm. (of mercury), were introduced into a solution of 0.4 part of sodium hydroxide in 100 parts of water containing 5 parts of calcium hydroxide and 5 parts of finely pulverized petroleum coke while maintaining a concentration of sodium hydroxide approximating 4 grams per liter and while maintaining the reaction mixture at a temperature approximating 50° C. 96% of the reacting chlorine dioxide formed chlorite, as either calcium chlorite or sodium chlorite, and small amounts of the reacting chlorine dioxide were converted to hypochlorite, chlorate and chloride.

*Example 2.*—2.5 parts of chlorine dioxide, in a mixture with air in which the partial pressure of the chlorine dioxide approximated 40 mm., were introduced into a solution of 1.6 parts of sodium hydroxide in 100 parts of water containing 10 parts of sucrose while maintaining the reaction mixture at a temperature approximating 20° C. 80% of the reacting chlorine dioxide formed chlorite, sodium chlorite, without formation of chlorate.

*Example 3.*—2.5 parts of chlorine dioxide, in a mixture with air in which the partial pressure of the chlorine dioxide approximated 40 mm., were introduced into 100 parts of water containing 10 parts of calcium hydroxide and 10 parts of dextrose while maintaining the reaction mixture at a temperature approximating 20° C. 70% of the reacting chlorine dioxide formed chlorite, calcium chlorite, without formation of chlorate.

*Example 4.*—2.5 parts of chlorine dioxide, in a mixture with air in which the partial pressure of chlorine dioxide approximated 25–40 mm., were passed into a solution of 0.4 part of sodium hydroxide in 100 parts of water containing 10 parts of sawdust (white pine and yellow pine) while maintaining the reaction mixture at a temperature approximating 20° C. 82% of the reacting chlorine dioxide formed chlorite, sodium chlorite, without formation of chlorate.

*Example 5.*—2.5 parts of chlorine dioxide, in a mixture with air in which the partial pressure of the chlorine dioxide approximated 10–25 mm., were introduced into a solution of 0.4 part of sodium hydroxide in 100 parts of water containing 20 parts of finely pulverized animal charcoal while maintaining the reaction mixture at a temperature approximating 20° C. 93% of the reacting chlorine dioxide formed chlorite, sodium chlorite, without formation of chlorate.

*Example 6.*—2.5 parts of chlorine dioxide, in a mixture with air in which the partial pressure of the chlorine dioxide approximated 10–25 mm., were introduced into a solution of 0.4 part of sodium hydroxide in 100 parts of water containing 5 parts of finely pulverized activated carbon while maintaining the reaction mixture at a temperature approximating 20° C. 88% of the reacting chlorine dioxide formed chlorite, sodium chlorite, without formation of chlorate.

In referring to "reacting chlorine dioxide" in the foregoing examples, I refer to that part of the total chlorine dioxide supplied which was absorbed in the reaction mixture as distinguished from that part of this chlorine dioxide which escaped from the reaction mixture as a gas together with the unabsorbed air forming part of the mixture in which the chlorine dioxide was supplied to the reaction. For example, in the embodiment of my invention as carried out by me according to the first of the foregoing examples, 62% of the chlorine dioxide introduced into the reaction mixture was absorbed therein, 96% of this 62% forming chlorite. In any particular case, the proportion of chlorine dioxide absorbed and the proportion escaping depend in large measure upon the manner of introduction, the effective contact between the total gas mixture and the liquid reaction mixture, with which my present invention is not concerned, and I have therefore stated the recoveries of chlorite with reference to the reacting chlorine dioxide.

In the application of my invention, either the alkaline material or the carbonaceous reducing agent or both may be present in the reaction mixture in solution or in suspension or partly in solution and partly in suspension.

It is important, however, in the application of my invention that the alkaline material and particularly the carbonaceous reducing agent be well distributed through the reaction mixture. Maximum distribution is of course obtained where the reagent is in solution. Where the reagent is in suspension, it should be present in an extreme state of subdivision and sufficient agitation should be provided to maintain the suspension substantially uniform.

Referring more particularly to suspended carbonaceous reducing agents, distribution of this reagent through the reaction mixture is important in that the formation of chlorate, rather than chlorite, tends to increase as the effective distribution of the reducing agent diminishes.

The maintenance of partial does not appear to be

I have claimed the use of sulfurous re... agents in the conversion, in aqueous media, chlorine dioxide to chlorites in my copending application filed August 15, 1934, Serial Number 739,887.

I claim:

1. A method of making water soluble chlorites which comprises introducing chlorine dioxide into an aqueous medium containing distributed therethrough an inorganic alkaline material corresponding to the chlorite to be made and a carbonaceous reducing agent.

2. A method of making water soluble chlorites which comprises introducing chlorine dioxide into an aqueous medium containing distributed therethrough a free base corresponding to the chlorite to be made and a carbonaceous reducing agent.

3. A method of making water soluble chlorites which comprises introducing chlorine dioxide into an aqueous medium containing distributed therethrough a free base corresponding to the chlorite to be made and a finely divided residual carbon.

4. A method of making water soluble chlorites which comprises introducing chlorine dioxide into an aqueous medium containing distributed therethrough a free base corresponding to the chlorite to be made and a sugar.

5. A method of making water soluble chlorites which comprises introducing chlorine dioxide into an aqueous medium containing distributed therethrough a free base corresponding to the chlorite to be made and a cellulosic reducing agent.

6. A method of making water soluble chlorites which comprises introducing chlorine dioxide into an aqueous medium containing distributed therethrough an inorganic alkaline material corresponding to the chlorite to be made and a cellulosic reducing agent.

7. A method of making water soluble chlorites, which comprises introducing gaseous chlorine dioxide into an alkaline aqueous medium containing distributed therethrough an alkaline material